United States Patent
Hertzman et al.

[11] Patent Number: 6,115,112
[45] Date of Patent: Sep. 5, 2000

[54] ELECTRONIC DISTANCE MEASURING INSTRUMENT

[75] Inventors: N. P. Mikael Hertzman, Sollentuna; Leif K-G Andersson; Lars A. Ericsson, both of Täby, all of Sweden

[73] Assignee: Spectra Precision AB, Danderyd, Sweden

[21] Appl. No.: 09/125,732

[22] PCT Filed: Mar. 3, 1997

[86] PCT No.: PCT/SE97/00396
§ 371 Date: Nov. 18, 1998
§ 102(e) Date: Nov. 18, 1998

[87] PCT Pub. No.: WO97/33182
PCT Pub. Date: Sep. 12, 1997

[30] Foreign Application Priority Data

Mar. 7, 1996 [SE] Sweden .................................. 9600897

[51] Int. Cl.[7] .................................................. B01C 3/08
[52] U.S. Cl. ..................... 356/5.01; 356/5.05; 356/5.03
[58] Field of Search .................................. 356/5.03, 5.01, 356/5.05

[56] References Cited

U.S. PATENT DOCUMENTS 3,630,616  12/1971  Everest et al. ........................... 356/5.03
4,259,592   3/1981  Frungel .................................... 250/574

FOREIGN PATENT DOCUMENTS 9100264     7/1992  Sweden.
2000411     1/1979  United Kingdom .................. 356/5.03
WO8701462-A1  3/1987  WIPO.

*Primary Examiner*—Stephen C. Buczinski
*Attorney, Agent, or Firm*—Pollack, Vande Sande & Amernick R.L.L.P.

[57] ABSTRACT

The invention relates to a method and device for measuring distances through the atmosphere against a target through propagation time measuring. Measuring light signals are transmitted towards a target and light pulses reflected by the target are received. The distance measuring includes a coarse measuring procedure and a fine measuring procedure. During the coarse measuring procedure at least one time point is fixed after which the measuring signal from the target can be expected to appear. During the fine measuring procedure a number of measurements are performed. The signal information collection during the fine measuring procedure takes place in a matching time space after the time point fixed during the coarse measuring. Preferably, the measuring during the coarse measuring procedure takes place with one or a few measuring pulses and measuring during the fine measuring procedure with a number of measuring light pulses. The light pulses have then during the coarse measuring procedure a higher light intensity than the measuring light pulses during the fine measuring procedure.

23 Claims, 5 Drawing Sheets

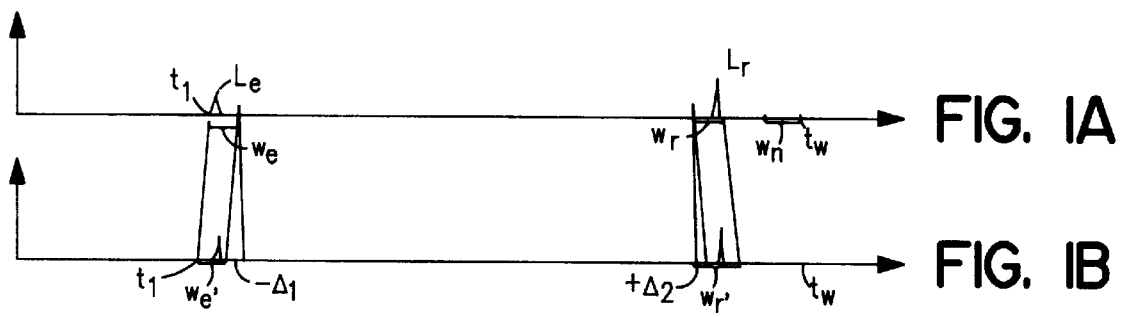
FIG. 1A
FIG. 1B
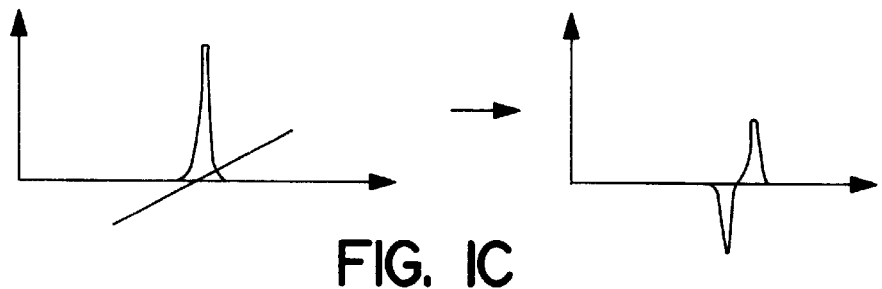
FIG. 1C
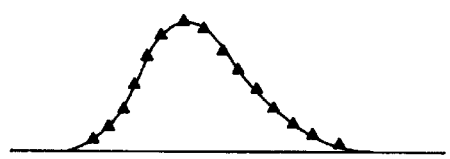
FIG. 2A
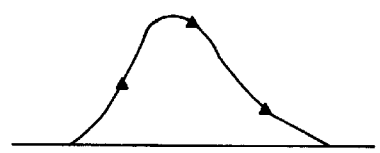
FIG. 2B

ELECTRONIC DISTANCE MEASURING INSTRUMENT

FIELD OF THE INVENTION

For a long time there have been in general two types of distance measuring devices on the market, which work by transmitting and receiving through the atmosphere light pulses along the same path to a distant target and calculating the distance to the target based on the difference between external received light pulses transmitted to the target and reflected by it, and internal light pulses travelling over an internal path in the instrument. According to the first type the phase difference between the internal and external alternating signals with essentially the same pulse length as the pulse space is investigated. According to the other type the time between the transmission of a short light pulse and its reception is measured. The invention relates to the latter type of distance measuring device.

BACKGROUND OF THE INVENTION

Normally this type of distance meter has a comparator in the measuring channel which performs a propagation time measurement between the transmitted and received signal pulses as is described in for example EP-A-475 326. The trigger point and delay in a comparator are always partly dependent on the input amplitude of the received signal pulse because the pulse is not square shaped but has a non-negligible rise time. Such an error should be eliminated.

If a pulse received from the target is detected in a comparator, then the signal-noise ratio for each pulse must be sufficiently high in order to eliminate false triggering by pure noise. This condition determines the range of the instrument. If the light source used is a laser or light diode then it must not be too powerful or give a too powerful radiation per time unit in accordance with the safety classifications for laser based instruments.

Different techniques have been used in order to perform an accurate propagation time measurement. A common method is to make a coarse determination through counting clock pulses from a high frequency clock. The resolution, however, is not sufficient with reasonable clock frequencies, wherefore the determination is complemented with an interpolation method. Such a distance measuring device is described in U.S. Pat. No. 4,620,700. This type of distance measuring device is adversely affected by non-linearities in the position determination.

SUMMARY OF THE INVENTION

An object of the invention is to provide a distance measuring instrument of the propagation time measuring type, which measures the propagation time for a light pulse to and back from a target in an exact and reliable way.

Yet another object of the invention is to produce a distance measuring instrument which is adapted to the security regulations for laser based instruments concerning the radiation per time unit but which gives fast and, at the same time, accurate distance estimates and a long range.

Another object of the invention is to produce a distance measuring instrument of the propagation time measuring type without a comparator in the measuring channels.

Yet another object of the invention is to provide a distance measuring instrument of the propagation time measuring type without non-linearities in the position determination of the target.

Another object is to provide a distance measuring instrument of the propagation time measuring type with a good resolution which can work with a comparatively weak light source. Another object is to provide a distance measuring instrument which combines long range with high accuracy.

A further object is to provide a distance measuring device which can measure the direct reflection from a target without a prism or towards a prism and which is able to measure with visible lasers or IR lasers.

According to the invention a method and a device for measuring distances through the atmosphere by means of propagation time measuring is provided, where the measuring light signal is transmitted towards a target and the measuring light signal reflected by the target is received and wherein the distance measuring comprises a coarse measuring procedure and a fine measuring procedure. The measuring during the coarse measuring procedure takes place with one or a few measuring light pulses in order to find a time position for the reflected pulse from the target. The measuring during the fine measuring procedure takes place with several measuring light pulses, significantly more than during the coarse measuring procedure, where the superimposing of the reflected pulses is performed around the time position obtained during the coarse measuring procedure. Preferably measuring light pulses during the coarse measuring procedure have a higher light intensity than the measuring light pulses during the fine measuring procedure.

After the coarse measuring, a measuring time period for the fine determination is preferably so set that the received pulses land completely within one of the measuring time intervals forming the measuring time region. The coarse measuring pulses can have a relatively large light intensity because they are alone (or only a few) in a relatively long period of time. In the system according to the invention many signals within a measuring time region with pulses can have their average value calculated in order to finely determine the distance. In this way each transmitted light pulse during the fine determination can have such a low light intensity that the returning light pulse disappears in the background noise of each received light pulse. The signal to noise ratio, however, increases with the root of the number of received measuring light pulses, the safety standards for laser based instruments can be achieved with a good margin.

Because of the fast measuring time the signals are preferably each stored in their own storing unit whereafter the average value calculation and noise discrimination can take place. This feature gives in turn a correspondingly large range for the instrument.

BRIEF DESCRIPTION OF THE FIGURES

The invention is described more closely below with reference to the accompanying drawings, where FIGS. 1A–1C show a schematic time diagram of an embodiment of the invention;

FIGS. 2A, 2B shows the time diagram in order to illustrate another embodiment of the invention;

DETAILED DESCRIPTION OF THE INVENTION

Figure 3:
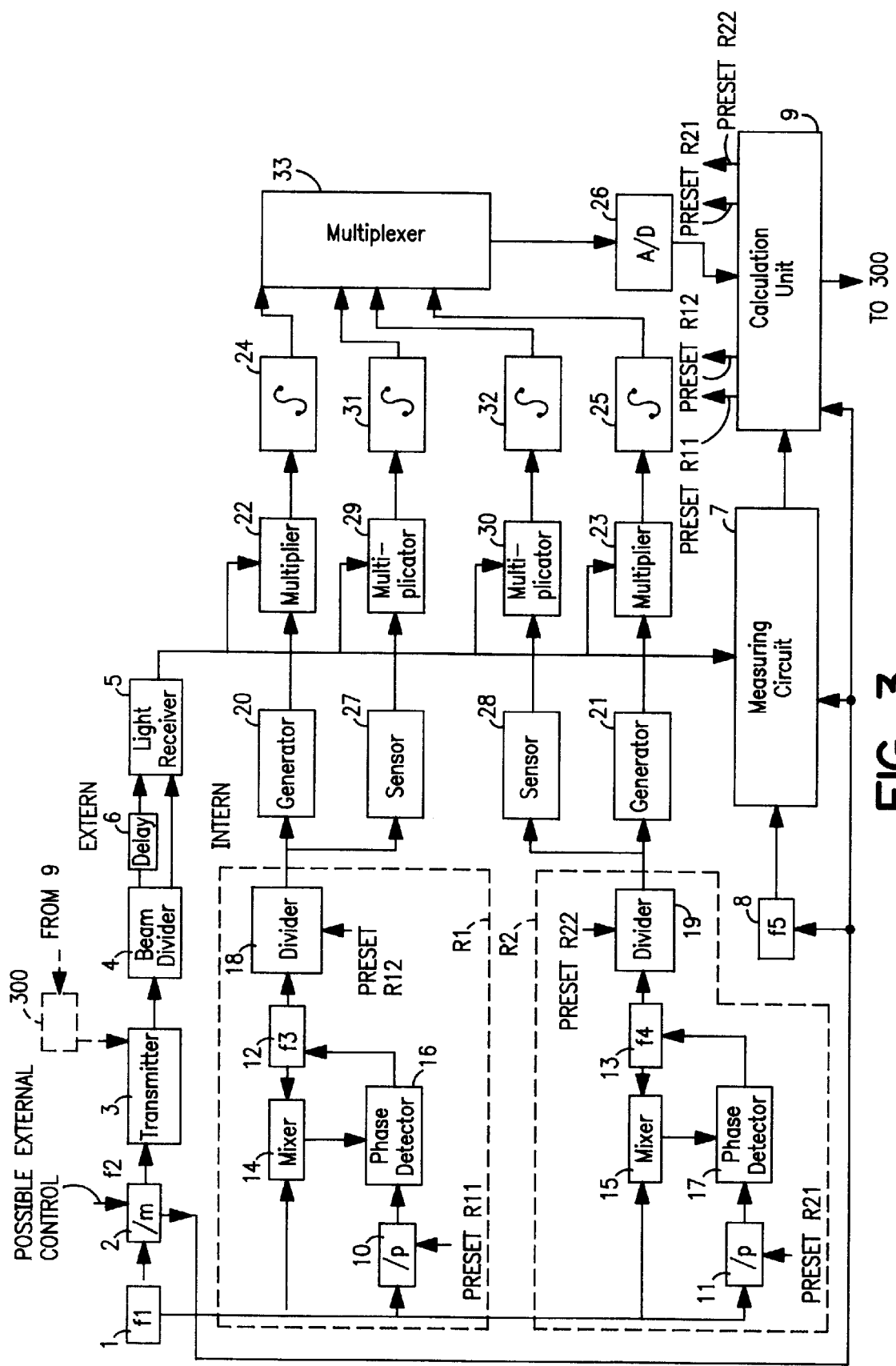
FIG. 3 shows a block diagram of the first embodiment of the device according to the invention.

The principle for the invention, as is illustrated in FIGS. 1A–1C is that during electronic measuring of distances with propagation time indication, a coarse measuring procedure is first performed, wherein, as is evident from FIG. 1A, a large measuring time interval from tl to tw can be formed, which includes a time, which preferably is selected to be longer than a anticipated propagation time for a measuring light pulse emitted from a distance measuring instrument to propagate towards a target, be reflected by it and be received by the instrument.

Preferably a light pulse produced by an instrument is divided up into a measuring light pulse part and an internal light pulse part. The same measuring channel should then be used for "external measuring", that is to say transmitting light pulses to and receiving them from a distant target, and for "calibration measuring" in a internal measuring loop in the instrument. The same light pulse should be used for these measurements and received by the same receiver in order to get true measurements of the time difference in real time.

The coarse measuring procedure is not in the first instant intended to give a coarse measurement of the distance itself but a coarse estimation of where the internal and the external measuring pulses end up within the measuring time region. The distance between the indicated measuring pulses gives, with correction for possible introduced delays, a coarse estimation of the distance to the target.

A measuring time region is set up around the time in the measuring time interval choice where the reflected measuring pulse can be expected to arrive, or at least a starting point for this is set up for the time region where the reflected measuring pulse is estimated to arrive. Thereafter a number of fine measurements are performed. Because the approximate time interval for the arrival of the pulse reflected from the target is known after the coarse measurement, the fine measurement and with considerably more measuring pulses, for example between 100 and 100,000, than during the coarse measuring procedure.

That which is calculated with the help of, and after the coarse measuring is how the measuring time region Wr should be placed in order that the arriving light pulses Lr received from the target shall appear in it. The received internal measuring pulses delay is with a large likelihood the same from measurement to measurement. Therefore, this time can be determined relatively well from the beginning in order to agree with delaying the region needs in order that the received internal measuring pulse should arrive within the region from the beginning. An indication of how displaced the internal measuring pulse is within its measuring time region can thereafter be performed in the way described below.

If the coarse measuring is performed with a single and relatively powerful pulse, then a calculation can be made in order to get the measuring time region which the external measuring pulse has arrived in, and also a suitable first shift of this measuring time region in order that the external measuring pulse approximately shall be placed in the middle of this region. This calculation is performed by a calculation unit, preferably a computer, which will be described in more detail especially in connection with FIG. 3.

According to one embodiment a fine installation displacement of both the measuring time regions for the external and the internal measuring pulses is performed. It is, however, within the scope of the invention for simpler, somewhat less accurate instruments to perform only the fine installation for the external measuring pulses.

During fine installation it is investigated how askew the signal pulses have arrived in their measuring region and how the measuring region should be displaced in order to preferably get the measuring signal pulses to arrive as symmetrically as possible around the center of the measuring time region, but at least so that the measuring pulse arrives completely within its measuring region. This is illustrated in FIG. 1B, wherein the displacement of the measuring time region We' for the internal light pulse Le is $\Delta t1$ and the measuring time region Wr' for the external light pulse is $\Delta t2$. Several fine measuring intervals can be undertaken with gradual displacement of the measuring time region until an optimal placing is achieved. It is, however, not necessary to have completely optimal placing, but when the measuring time region is placed with the pulse completely within the measuring time region, a calculation of the measuring path can be made based on the measuring time regions placed within the measuring time interval and the respective pulses placed within its measuring time interval.

It should be noted that the coarse measuring can be performed in different ways, and that the following descriptions in connection to FIGS. 3–6 of these are mentioned as suitable embodiments.

During each fine measuring operation preferably a large number of measuring pulses are transmitted. The result of each measuring is stored, and the combination of the measuring results, such as by adding or calculating the average value, is performed thereafter. This can take place either before or after a certain treatment of each received measuring signal.

Before each displacement of the region during the fine measuring according to one embodiment, such as shown in FIG. 1C, for each of the received measuring time region We' and Wr' a time dependent signal can be produced, which runs through a zero point preferably in the middle of the intended measuring time region. This time dependent signal can be a ramp signal but also a signal with gently curved ends, such as a half sine wave with the start at 90° or a signal, which starts and finishes parallel with the zero line and rises or falls in between. Alternatively the shape of the signal can be, for example a short ramp signal or a period of a sinus signal with much shorter period than the length of the measuring time region. The time dependent signal is multiplied with the measuring signal pulses received for the intended measuring time period. The multiplied measuring signal pulse is integrated over the measuring time region. The region is shifted either at one measuring occasion or gradually during measuring occasions, until the signal multiplied by the time determined signal and integrated over the measuring time region becomes close to zero within a predetermined variation. This is illustrated to the right in FIG. 1C, where the combined signal made of the ramp signal and the received pulse is shown before integration.

The distance to the target is then calculable through knowledge of the time distance between the displaced measuring time regions within the measuring time interval and calculation of the length of the pulses within this, which is based upon the remaining difference from zero which is obtained during integration over the measuring time region.

According to another embodiment, during fine measuring, the sampling can take place at suitable times during the time that a reflected pulse is being received. The sampling method can be started at the expected starting point for the reflected pulse obtained during the coarse measuring. At least two, preferably more, samplings shall occur during each pulse.

The shape of the pulse which the light source transmits cannot be considered stable with sufficient accuracy but can be expected to vary with temperature and other parameters of the light source. According to the first described embodiment this is handled through producing a measuring signal which weighs the appearance of the whole pulse. In a digital method, sampling sufficiently tightly is associated with great difficulties and costs. According to this embodiment the curve shape of the pulse is instead determined in a calibration method on the internal pulse, which is shown in FIG. 2A. This is transiently stable and has a high signal to noise ratio, wherefore tighter sampling can be made through time displacement of the sampling points during the different measurings in a measuring series. Thereafter the position of the measuring pulse is determined, shown in FIG. 2B, based on a few samples during each received measuring pulse and with the information of the pulse form obtained from the calibration. As is evident from FIGS. 2A and 2B, the sampling of the internal pulse, the calibration pulse, is performed significantly tighter than the subsequent sampling of each measuring pulse.

Another difficulty with the detection of a measuring pulse is that the amplitude of the received signal from the target can vary greatly because of, for example, turbulence in the atmosphere. In order that this shall not give erroneous information on the pulse shape of the received reflected measuring pulses, it is important that sampling in at least two, preferably more, different time positions occurs parallely, that is to say on the same pulse. The time distance between parallel samplings is chosen with reference to the length of the pulse. After integration of the stored sampling values for all pulses, a curve shape fitting and preferably also an amplitude fitting takes place. The displacement of the time point for the sampling should be chosen so that an as good as possible signal noise ratio is obtained.

A FIRST EMBODIMENT

A first embodiment is shown in FIG. 3. The instrument shown here works with analog signals. A pulse signal with the frequency f1 is produced in an oscillator 1, which is a master oscillator with a relatively high frequency, for example 25 Mhz. The frequency f1 is frequency divided by m in a frequency divider 2 so that a signal f2 with the frequency f2=f1/m is formed, where m is an integer.

The frequency f2 is selected so that a light pulse emitted towards a target through the atmosphere is able to be reflected by the target and received in good time before the next pulse is emitted. If m is chosen relatively high, for example to be 510, a repetition frequency f2 of approximately 49 kHz is obtained. This corresponds to a resolution of approximately 3 km. If the distance in any individual case therefore would be longer, a possibility exists to control the frequency divider 2 to another value for m is order to, in this way, achieve different measuring regions.

The signal pulses in f2 are extremely transient in relationship to the pulse space. The signal pulses f2 give a modulation of a light source in a transmitter 3 which preferably includes a laser with radiation within IR or the visible wavelength regions. The divergences of the transmitted beams should be small, for example parts of a mrad, in order to get good measuring accuracy and a large amount of the measuring beam reflected back towards the instrument. These characteristics shall, however, not be considered as a limitation for the inventive concept.

The modulated signals are emitted by transmitter 3 to a beam divider 4 which divides it up into an internal and external part. Light pulses with an exact square shape are not obtained and they have the bell shape which is shown in FIGS. 1A–1C and 2A and 2B.

One part of the light signal form the beam divider 4 propagates through an internal path in the instrument to a light receiver 5 and forms signal pulse Le (FIG. 1A). The other part is emitted towards a reflected on a target object, and reflected by the reflector back to the receiver 5 of the distance measuring device, where it is received as signal pulse Lr (FIG. 1A).

A delay unit 6, for example consisting of a wound optical fiber which gives a certain delay of the external beams is suitably placed in the outer channel. The length of the optical fiber in a delay unit can, for example, a 5 to 20 meters and can be placed in connection to the transmitter or receiver optics. The purpose of such a delay is to ensure that a pulse received from a target definitely arrives after the signal received from the internal channel.

The receiver 5 is preferably, as is normal in this type of instrument, provided with an optical bandpass filter which largely only allows the receiver detector to react to light with a narrow passband around the wave length for the laser transmitter used.

The pulse repetition frequency from the frequency divider 2 can consequently be chosen to be around 49 kHz. This signal goes to the laser, respectively to the digital controlled delaying units, but also to a number of internal circuits in order to set the start times for these. A short measuring pulse is sent from the laser. This goes partly directly via the internal channel for beams to the receiver 5, which detects a start pulse Le, and partly out through the transmitter optics via the prism to the receiver optics and receiver, where a stop pulse Lr is detected. Consequently two pulses come from the receiver for each light pulse sent, the first called start pulse and the second called stop pulse. The time position of the stop pulse (and possibly also the time position of the start pulse) are measured during the coarse measuring procedure in order to be able to calculate the approximately position for the measuring time region in which the external measuring pulse will end up. The delay separates these pulses even further in time. It should be noted that during later calculation of the final result of the distance measuring device a compensation for the introduced delay takes place.

The pulses Le and Lr in the embodiment shown in FIG. 3 are fed to a coarse measuring circuit 7 which opens the coarse measuring time interval with a signal from the frequency divider 2.

Different methods for coarse measuring are conceivable. The method illustrated in FIG. 3 is for coarse measuring a single light pulse is transmitted towards the target with a light intensity which gives a return pulse which is so high that it clearly surpasses a discrimination level which is set in order to discriminate away noise. In this way the time position for the measuring region Wr can be directly determined. This method can also be in compliance with the laser regulations as these allow higher output effects for a single pulse than for a pulse train.

Therefore, only the light signal pulse transmitted for the coarse measuring procedure needs to have a relatively light intensive emitted signal pulse in order that a comparator, which compares the signals with a predetermined reference level, shall be able to detect a received signal pulse. During the fine measuring procedure the time placement of the received signal pulse is relatively accurately determined. The light pulses for the fine measuring have a considerably lower light intensity than during coarse measuring. They can indeed lie under the general noise level if the result of a number of fine measuring pulses are integrated. The adjustment of the light intensity is performed by a adjustment unit 300 which is controlled by the calculation unit 9 of the instrument.

The adjustment of the light intensity or variation of the output energy of the light source can take place in different ways. One method is to use a laser diode as the light source and vary the drive current for it. During use of another type of light source, where the output of power cannot be controlled as easily, other methods must be applied. If a light source with a high pulse energy is used, for example a pulse microlaser, a damping device can be placed in a beam path in order to dampen the output energy during fine measuring. This damping device can dampen straight over the whole wavelength region. If, however, a light source is used which transmits two or more wavelengths, then the damping device can be wavelength selective so that it only dampens a wavelength region or a limited number of wavelength regions and, for example, leaves only one wavelength region undamped or only damped a small amount.

In this way the coarse measuring and fine measuring are performed at different wavelengths. It could also be possible to use a controllable laser, where several wavelength regions can be connected when the more powerful beam is required and the laser controlled to transmit the beam in only one or a few, wavelength regions when a weak beam is required. Another possibility is to use two different light sources for coarse and fine measuring.

In the coarse measuring procedure shown in FIG. 3 a clock 8 which has an extremely high clock frequency f5, for example 100 Mhz, is used and a calculator (not shown) in circuit 7 is clock controlled. The calculator is started by the digitalized reference pulse which is obtained from the frequency divider 2. The calculator stops during reception of the start pulse Le and stop pulse Lr. With a clock frequency of 100 Mhz a resolution of 10 nanoseconds is achieved which corresponds to 1.5 meters. The result of the coarse measuring can be performed by a calculation unit 9, preferably the control processor of the instrument, which from the received information calculates the coarse distance and thereby the measuring time regions time position during the coarse measuring period.

Just after the coarse measuring time procedure itself, as shown in FIG. 1A, in most cases the stop pulse is asymmetric, that is to say not in the middle of its measuring time region. Thereafter the measuring time region is moved within the measuring time interval so that the indicated signal pulse will lie completely within its measuring time region (as is shown in FIG. 1B).

In the case shown the measuring time region We is moved time $\Delta t1$ backwardly and the measuring time region Wr is moved $\Delta t2$ forwards in time. An adjustment of the position of the region can then be performed in stage p, which will be described in more detail below.

The calculating unit 9 consequently calculates a precisely adapted displacement of the measuring time region for the start pulse based upon experience of earlier displacement and a precisely adapted displacement of the measuring time region for the stop pulse based on the coarse measuring. As mentioned above, displacement of the first measuring time region for the start pulse is relatively well determined for each instrument because the internal measuring path is approximately constant.

DESCRIPTION OF THE CIRCUITS R1 (AND R2)

The displacement of the respective measuring time regions is performed in two circuits; R1 for the internal pulse signal respectively R2 for the external pulse signal. One circuit gives the region's displacement for the internal measuring pulse and the other for the external. Each circuit R1, R2 is constructed in the same way. Therefore, only the circuit R1 will be described. It should be noted that while measuring is in progress it can be appropriate to let the circuits change function with each other. In this way possible component variations between the circuits can be balanced out. Even if this is not shown, it is possible to let the circuits R1 and R2 be the one and the same circuit and, for example be used alternately for fine measuring through the external and the internal paths.

The calculating unit 9 control some circuit components in the circuits and the changeover between the circuits occurs quite simply through the calculation unit changing the control of them and systematic errors are avoided.

The circuit R1 comprises a calculator 10, which gives a calculation in stage p, connected to an oscillator 1. It is this which gives the region's displacement its high resolution. The number of steps to phase shift the signals from the oscillator 1 is given by the calculation unit 9 on a control input 'Preset R11'. A phase displaceable oscillator 12 with the frequency f3 is in the circuit R1. The same type of oscillator in the circuit R2 has the reference 13 and has the frequency f4.

The outputs of the oscillators 1 and 12 are connected to a mixer 14 which gives an output signal with the difference frequency f2. A phase detector 16 detects the phase between the outputs of the mixer 14 and calculator 10 and phase shifts the oscillator 12 on its control input.

The phase shift signal of the oscillator 12 is divided by n in a divider 18 which also serves as a gate and allows through one period from the oscillator. This function gives the large working region coarsely within the measuring time region. The choice takes place via preset R12 from the calculating unit 9. Thereby, f3=n*f2, where n is an integer.

The output from the circuit R1 connected to a generator 20 for the time dependent signal. From now on the generator will be called ramp generator and the signal ramp signal even though it can have a different shape as mentioned above.

The circuit R1 consequently gives adequate start time to the ramp generator 20 which, as an output signal gives a ramp signal over the measuring time interval, which ramp preferably lies symmetrically around a zero level in the middle of the measuring region from the internal beam pulse.

EXAMPLES OF SUITABLE FREQUENCIES

Oscillator 1 is a master oscillator with a frequency f1 of, for example 25 Mhz. If the division number m in the frequency divider 2 is chosen to be 510 then a repetition frequency f2 of approximately 49 kHz is obtained for the transmitted measuring pulses. This corresponds to a resolution of approximately 3 km.
For f3

$$f1-f3=\pm f1/p \tag{1}$$

that is to say $$f3=f1(1\pm 1/p) \tag{2}$$

The received pulses shall always occur at the same phase position on the signal f3 with a given distance. This implies that f3 must be a multiple of f2, that is to say f3=n*f2 and f1=m*f2. In that case from equation (2) come the following conditions:

$$n = m*(p \pm 1)/p \quad (3)$$

where n, m and p shall be integers.

For example, n=512, m=510 and p=255.

DISPLACEMENT OF THE REGION

As mentioned above the received signal pulses arrive in any of n (for example 512) periods of the signal with frequency f3 from the oscillator 12. With the above stated exemplifying measurement, a period corresponds to approximately 6 meters.

For the ramp generator 20 it is necessary to select the period in which the received pulse is and over this period generate a ramp signal (or a rising or falling signal formed in another way), which at the half period goes through zero. The ramp is then multiplied in a multiplier 22 with received signal pulse Le. The signal obtained is integrated in the integrator 24 during the measuring time region.

Pulse transmission towards the target are performed for a number of measuring periods. If the integrator is not set to zero between the repeated pulses then automatically an average value of the intended number of measuring pulses is obtained.

A way of performing the average value formation is consequently to, during the measuring operation itself, store the signals obtained in the unit 24. These can be of analog type and the integration and formation of the average value can take place analogly but is also possible to perform the signal processing digitally and store the signals in digital memory arrays. In this case how the sampling must be performed is described more closely in connection to the digital embodiments in FIGS. 5 and 6.

The integrator 24 can, but does not have to, be a relatively uncomplicated type, for example made only of an RC link. The integrated value is fed to a multiplexer 33. The circuits 20, 22, 24 in this case work analogly and the analog signals from the integrator 24 is analog to digital converted in an A/D converter 26 before it is fed to the calculating unit 9. The A/D converter 26 should therefore have a good resolution, for example of 10 bytes. This signal gives information to the calculation unit 9 on where within the measuring time region the pulse lies in way as will become evident more closely below.

The measuring time region must now be moved so that the pulses arrive completely within this and preferably so close to the middle of the region as possible. Within the region one must also reckon with a certain non-linearity wherefore the best accuracy is achieved if the pulses can be placed so near to the middle of the region as possible. Non-linearities can be measured by, with different time delays, measuring and calculating the pulses time position in the internal channel. The displacement of the measuring time region can be performed through presetting the calculator 10 which thereby shifts the phase of the frequency f3 in the oscillator 12. This can be done in step p (for example 255).

The measuring pulse transmission towards the target with shifting of the measuring time region can be repeated until the signal from the integrator 24 is close to zero.

Normalizing

The amplitude of the received pulse naturally influences the value out from the multiplier 22 and the integrator 24. In order that this shall not affect the measuring there is a further channel connected to the output from the circuit R1. Instead of multiplying the signal obtained with a time dependent signal, for example a ramp, a time independent signal obtained from a constant voltage sensor 27 in a multiplicator 29 is used. The output signal from this gives a measurement of the pulse amplitude of the received signal pulse. Here the first integration or average value formation is first performed during a number of measuring periods in an integrator 31. The signal treatment during the period with repeated sending and receiving against a target is naturally performed in the same way as for signal treatments with the use of the time dependent signal. The signal from the integrator 31 is fed through to the calculating unit 9 via the A/D converter 26.

In order to eliminate the signal dependency, the calculating unit 9 calculates the quotient between the value from the integrator 24 of the ramp and the constant channel integrator 31. An amplitude independent measurement of the pulse's position is obtained.

The measuring time region can be moved within the measuring time interval until the signal is centered in the region that the signal value lies within a predetermined absolute value in relationship to zero. The thereby achieved positive or negative rest value is then used in order to calculate an extra adjustment of the position of the signal pulse's position on the time scale.

The elements with the references 10, 12, 14, 16, 18, 20, 22, 24, 27, 29, 31 in the circuit R1 with connected channels have their exact correspondences in the respective elements with the reference 11, 12, 15, 17, 19, 21, 23, 25, 28, 30, 32 in the circuit R2 with connected channels. The control signals Preset R11 and Preset R12 from the calculation unit 9 have their correspondences in Preset R21 and Preset R22 which makes it simple for the calculation unit 9 to swap the circuits R1 and R2 with each other through quite simply swapping the control signals for the circuits. The output signals from the four different channels are fed preferably at different time points to the calculating unit 9. Therefore, the signals from the channels are connected to a multiplexer 33 before they are fed to the A/D converter 26.

THE SECOND EMBODIMENT

Figure 4:
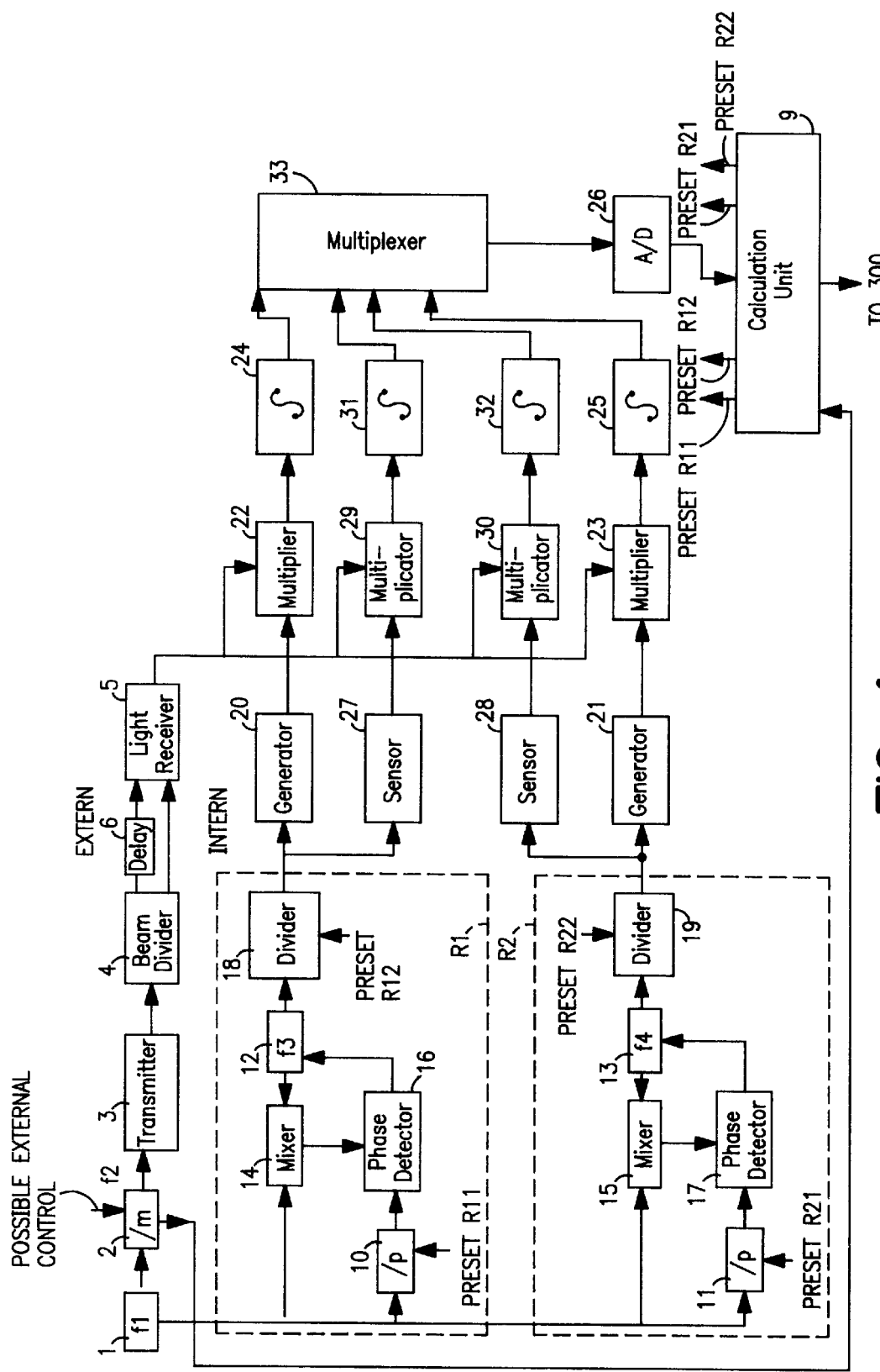
FIG. 4 shows a block diagram of a second embodiment of the device according to the invention.

FIG. 4 shows a different way of performing a coarse measurement than that described for FIG. 3. Similar parts to the parts in FIG. 3 have received the same reference number and will not be described in more detail. In FIG. 4 the coarse measurement is performed during a coarse measuring procedure with a number of transmitted coarse measuring pulses, searching with successively increasing time shifts for the received signal pulses, for example starting from the pulse from the frequency divider 2. Therein, the channels 27, 28 are used where the signals are multiplied by a constant. The output signals from these are a measurement of the amplitude of the pulse. It should be noted that it is often not absolutely necessary to search over the whole measuring time region. If the distance being looked for is expected to lie within a certain partial interval within the measuring time interval then it is only necessary to investigate this interval. The time region after the receipt of a measuring pulse does not have to be searched either, other than in exceptional cases. Reflected signals from hits against unintended targets can be discriminated away by not coarsely investigating the measurement time regions where it can be suspected that such a target is indicated.

The special coarse measuring circuit 7 with its clock generator 8 is therefore not required, as the coarse measuring procedure is performed under the control of the calculating unit 9 with the use of the same circuits which are used for the fine measuring. In this embodiment of the coarse measuring, several light pulses are transmitted and an adding or average value formation of the received signal for each time shift occurs. The number of transmitted measuring pulses within each time slot is, however, considerably less, for example between 10 and 100, than during fine measuring, which has for example, between 100 and 100, 000, as one is only trying to coarsely place the time region within the measuring time interval, while fine measuring is used in order that a light pulse should arrive within the measuring time interval. In this way the coarse measuring can also be performed on signals which do not exceed a general noise level.

A combination of the above-mentioned coarse measuring cases is also conceivable. The first, described in connection to FIG. 3, can for, example, be performed with a number of smaller pulses.

THE THIRD EMBODIMENT

Figure 5:
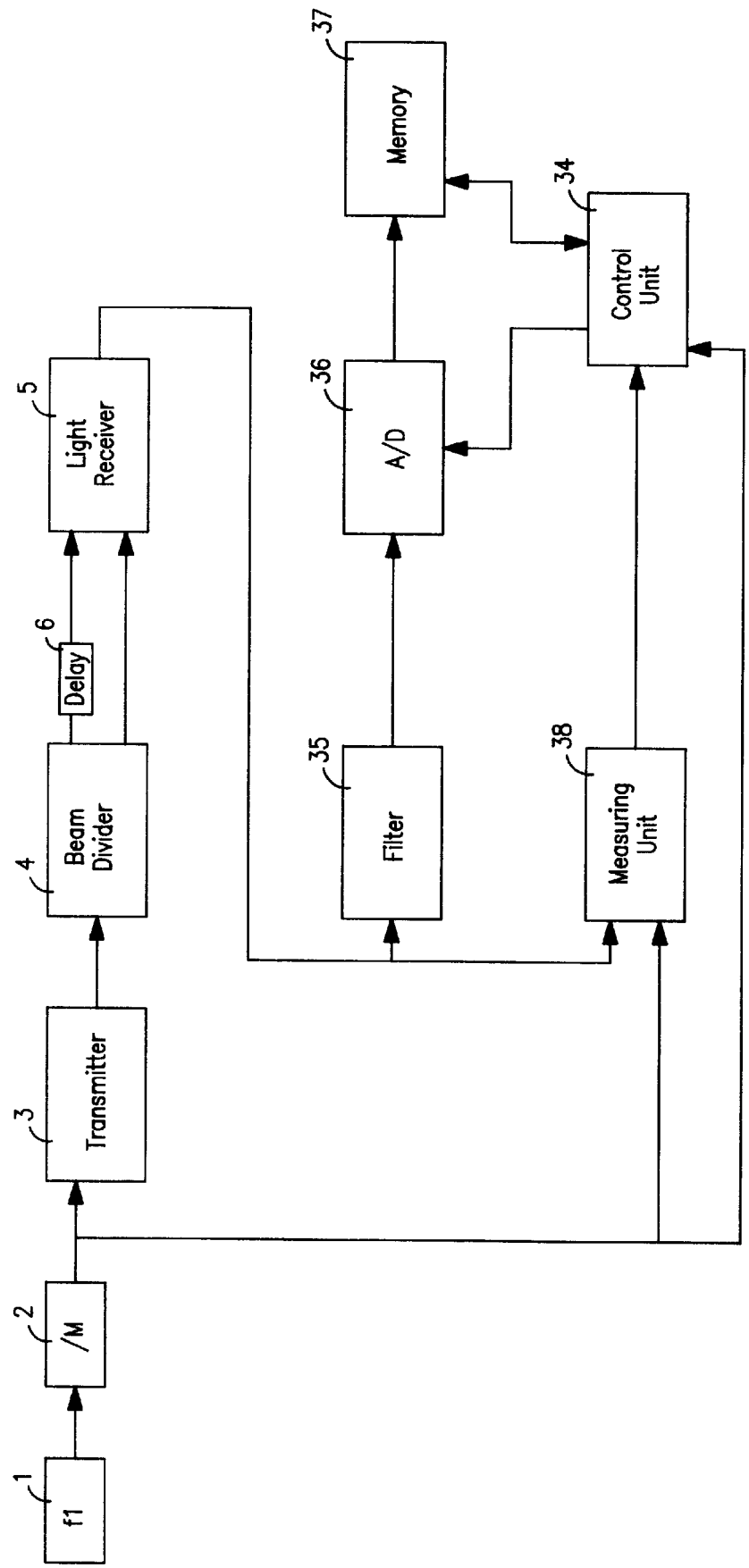
FIG. 5 shows a block diagram of a third embodiment of the device according to the invention.

In another embodiment, the block diagram of which is shown in FIG. 5, the complete signal processing occurs digitally but the algorithm of the signal processing can in one embodiment correspond to the functions which are given in the block diagram in FIG. 4, that is to say multiplication with a time dependent or a time independent function, integration and normalising. The blocks 1–6 can have the same shape and function as the corresponding blocks in FIGS. 3 and 4. A filter circuit 35 coarse filters the signal in order to remove a part of the noise and band limit it to approximately half the sampling frequency.

The signal obtained from the receiver 5 is analog/digital converted in an A/D converter 36 which, in this case, must sample with a relatively high sampling frequency in the region of tens of Mhz and up towards the Ghz frequency region. The sampled signals are preferably each stored in their own memory array or in their own memory, directly whereafter they are added or averaged. The signal lengths during a measuring time zone with sampling are sufficiently short such that memory available on the market is suitable for this storage despite the high sampling are sufficiently short such that memory available on the market is suitable for this storage despite the high sampling frequency and the large number of measuring signals. The repetition frequency for the measuring signal is so high that the averaging with current techniques should take place first after the measuring and storage of the measuring signal in order to achieve a correct result.

The control unit 34 has a intermediate storage memory 37 and is equipped with software which simulates the way of working which is described in connection to FIGS. 3 and 4. For example, the coarse measuring procedure can be used as described in connection with FIG. 4. Thereby, the coarse measuring 38 is like a part of the control unit 34, as can be easily seen.

In this embodiment modifications are conceivable in relationship to that which applies to the analog case. For example, an average value formation of a number of A/D converted signals received from the receiver can be performed before multiplying with the time dependent and time independent signals, which completely or partially can replace the addition and integration in the integrators 24, 25, 31 and 32 in FIGS. 3 and 4. Other types of time dependent signals than those described above in order to multiply the received measuring signal can be used in a digital application, for example, pure square signals alternating between positive and negative values during a predetermined part of the length of the measuring time region. This part is preferably half the length of the region with equal vales of the positive and the negative parts. It is, however, also possible to place the zero transition asymmetrically. This characteristic with an asymmetric zero transition of the time dependent signal can also apply for the analog case.

THE FOURTH EMBODIMENT

Figure 6:
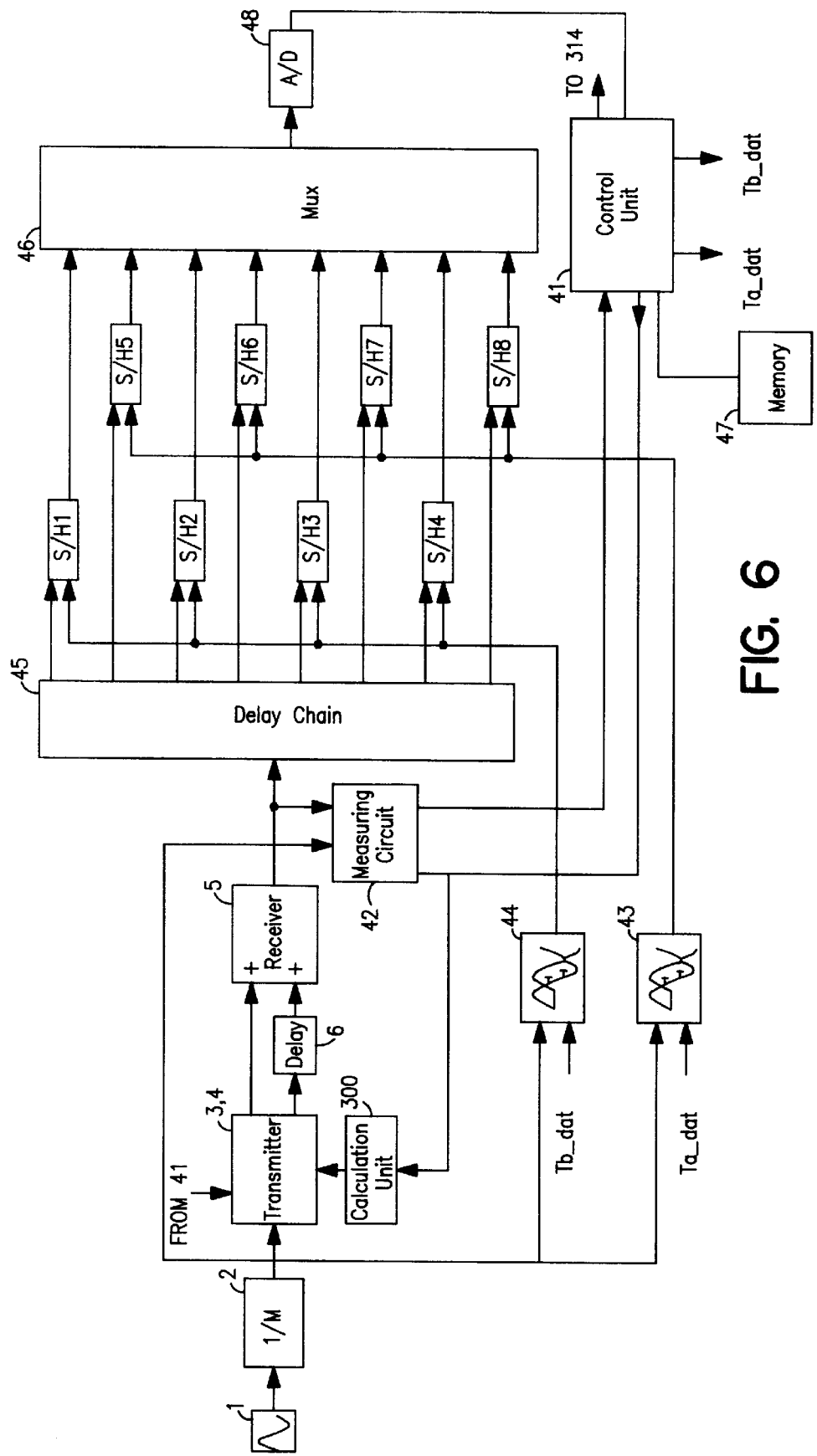
FIG. 6 shows a block diagram of a fourth embodiment of the device according to the invention.

Yet another embodiment is shown in FIG. 6 which is based upon that shown in FIGS. 2A and 2B. This embodiment is the preferred. The coarse measuring is performed with one or a few pulses with an increased light intensity. A control unit 41 starts the coarse measuring through adjusting the light energy per transmitted measuring pulse from the transmitter 3 to high in the adjustment unit 300 connected to the transmitter 3.

If the amplitude of the received pulses is sufficiently high for them to be easily detectable, then the time position of the detected pulses is directly detected in the coarse measuring circuit 42 and fed to the control unit 41 which determines at lease one conceivable time point for the beginning of a reflected light pulse. Through one first strong pulse (or a few pulses) it is possible to fulfill the signal conditions for the later case in order to achieve an immediate determination of the coarse position of the measuring time region. The measuring time region in this case is given by the length of the delay chain, while its position is determined by the time delaying circuits 43 and 44 controlled by the control unit 41.

If the amplitude of the received pulse is not sufficiently high for this method then a method is applied which is equivalent with that as described for the second embodiment. In the actual embodiment the amplitude information is given directly by sampling values according to the description below.

Thereafter, the fine measuring procedure starts. The control unit adjusts, via the adjusting unit 300, the light intensity of the transmitted 3 to a low value. It is the control unit 41 which controls the number of measuring pulses which are to be transmitted during both the coarse and fine measuring procedures.

A calibration method is performed wherein the instrument reference pulses via the inner circuit which has a good and reliable signal to noise relationship are sampled during the fine shifting of the sampling moment during a number of measurements so that, seen in total, a tight sampling of the pulse is achieved as is evident from FIG. 2A. It should be noted that the calibration method and measuring method for the light pulses reflected by the distant target preferably occur parallel in two different channels (and not in series with each other), as the internal and the external pulses are obtained simultaneously during the whole measuring.

In FIG. 6 sampling through the use of hold circuits S/H1-S/H4 during the control of a shifting circuit 43 controlled by the control unit 41 for the internal beam path and hold circuits S/H5-S/H8 during control of a shift circuit 44 controlled by a control unit 1 for the outer beam path is illustrated. The circuits 43 and 44 and the hold circuits have the same construction and their functions are alternatively exchangeable with each other. This can be used in order to balance out possible component differences between the circuits.

The signals coming in via the internal and outer circuits from the receiver 5 are fed to a delay chain 45 so that all the hold circuits S/H1-S/H8 are fed with a received pulse from the receiver 5 each with their own individual delay.

The control unit 41 controls in this case the delaying circuit 43 with the above-mentioned fine shift from pulse to pulse through measuring via the inner path while the shifting circuit 44 is not changed from pulse to pulse through measuring via the external path. The hold circuits perform their hold functions controlled by the circuits 43 and 44.

It is instead possible to fine shift the pulse position from pulse to pulse whereby the circuit 43 does not change while the circuit 44 compensates the fine shifting of the pulse position. This case is, however, considerably more difficult to perform.

The measured amplitudes in the sampling points are set the same in a multiplex unit 46, A/D converted in a A/D converter 48 and stored in the control unit 41 or in its memory 47. The control unit 41 is provided with programs in order to calculate the parameters in a mathematical expression, for example a polynomial, which describes the shape of the pulses.

The received pulses, which are emitted towards and reflected by the target are consequently sampled sparingly but even so at such short intervals that at least two samples are obtained within the length of the received pulse. In the embodiment shown four sampling occur.

According to this embodiment integration, or average value formation takes place before the multiplexer 46 and/or in the control unit.

The calculation of the time position within the measuring time interval for the received external pulses in relationship to the reference pulse (through the internal path) is performed through the sampling amplitudes being compared with the calculated expression for the pulse shape.

The time delay which gives the best fit to the reference pulse is looked for. This delay, together with the start time of the measurement time region, gives the looked for time difference between the reference pulse and the measuring pulse, the distance that is being looked for, possibly with compensation for introduced delays, such as by the unit 6. The distance is calculated with special programs in the control unit 44. Such a program can be easily written by a person skilled in the art with the guidance of the above-given information and is therefore not described in more detail.

Many modifications are conceivable of the shown embodiments within the scope of the invention which is given by the appended Claims.

For example, an investigation during the coarse measuring period is used if several measuring pulses occur in the measuring time interval. This can occur if several targets happen to lie in a line with each other and the nearest target happens to be partially transparent. Thereafter the investigation of the distance with the same fine adjustment method can take place individually for each target hit.

It is also possible to divide up the light pulses for transmitting in several beams directed in somewhat different directions and consequently measure towards for example different paths of the same target, which for example has a deep structure. The directing towards different target points can thereby be controllable and perform during a aiming period before the measuring itself. The operator in this case chooses the target points which should lie on well-discriminated distances, so that the reflected beams from them will be received during different partial time regions.

The circuits R1 and R2, with the following circuits in FIGS. 3 and 4, can be multiplied as required. In the same way a multiplying of selectable several partial time regions for investigation can be easily performed by the control unit 34 in FIG. 5 or 44 in FIG. 6. Such a feature can permit parallel investigation of several measuring time regions during the coarse measuring method as described in connection to FIG. 4. It is also possible to indicate that the measuring pulses lie completely within a measuring time region through simultaneously investigating the measuring region on each side of it in order to indicate that their integrated output signals become approximately zero.

What is claimed is:

1. Distance measuring device with propagation time measuring, where the instrument is equipped with a light source unit (3) for sending measuring light signals through the atmosphere to a target and a light receiver unit for receiving measuring light signals reflected by the target, wherein the distance measuring device includes a coarse measuring means for coarse measuring during a coarse measuring procedure and a fine measuring means for fine measuring during a fine measuring procedure, wherein the coarse measuring means fixes within a measuring time interval at least one time point after which the measuring light signal reflected from the target can be expected to appear, and the fine measuring means controls the light source unit to emit a number of light pulses per measurement and perform signal information collection in the measuring time interval for each measurement in a measuring time region after time point fixed during coarse measuring, and to combine the measuring results for the measuring during the fine measuring procedure with each other.

2. Distance measuring device according to claim 1, wherein the coarse measuring means controls the light source unit to emit a light pulse per measurement and to detect reflected measuring pulses from the target, determine an approximate position of the reflected measuring pulse in the measuring time interval and calculate placement of the measuring time region in the measuring time interval.

3. Distance measuring device according to claim 1, further comprising a controllable light intensity regulating unit for the light source unit wherein the regulating unit controls the light source to emit considerably higher light energy per pulse during the coarse measuring than during the fine measuring.

4. Distance measuring device according to claim 1, wherein the coarse measuring means searches for the measuring time interval in a number of selected measuring time regions in which the measuring light signal pulses received from the target are likely to appear, for each measuring time region, information from several collections in this region are combined.

5. Distance measuring device according to claim 1, wherein
   the fine measuring means during the fine measuring procedure move the measuring time region in the measuring time interval until the measuring light signal received from the target is at least present in the measuring time region; and
   further comprising a calculation device which calculates a measured distance based on the position of the measuring time region and the position of the reflected light signal in the measuring time region.

6. Distance measuring device according to claim 1, wherein the fine measuring means is arranged by means of a signal form generator means to form a time dependent signal over the measuring time region and with a multiplying means to multiply the time dependent signal with the measuring light signal received from the target during the measuring time region, and an integrator means to perform an integration of the multiplied signal over time for the measuring time region.

7. Distance measuring device according to claim 6, wherein the time dependent signal has a zero transition in the measuring time region, and the calculation unit calculates at which displaced measuring time region position within the measuring time interval an output signal of the integrator will be close to zero.

8. Distance measuring device according to claim 7, wherein a second measuring signal treatment channel comprising multiplier means which, during each measuring time region for the received signal, multiplies the received signal with a time independent signal and an integrator means which integrates the multiplied signal during the time for the time region, wherein the means which divides the signal multiplied by the time dependent signal and integrated with the signal multiplied by the time independent signal and integrated; and that the calculation unit (9; 34) determines the measuring time region's placement within the measuring time interval as being optimal when this division is closest to zero.

9. Distance measuring device according to claim 1, wherein the transmitted measuring light signal is also arranged to be transmitted over an internal measuring path in the instrument, the same fine measuring means is used, for a second measuring time region in which the interval measuring pulse is received in the measuring time interval and that a second calculating unit calculates the measured distance based on the time between the two measuring time regions and the position of the pulses within them.

10. Distance measuring device according to claim 1, where a transmitted measuring light signal is also transmitted over an internal measuring path in the instrument, the fine measuring means performs a fine measuring for a second measuring time region in which the internal measuring pulse is received; wherein the internal measuring pulse received by the internal measuring path is sampled in a sampling device during the shifting of the internal measuring pulse, so that a tight sampling of the internal measuring pulse is obtained, and further comprising a calculating unit which calculates parameters in a mathematical expression, which describes the shape of the pulse out of the amplitudes of sample points.

11. Distance measuring device according to claim 10, further comprising a sample device, during fine measuring, performing a sparse sampling with at least two samples per reflected measuring pulse with a starting point in each measuring time interval from the time point fixed during the coarse measuring, and that the calculating unit, after combination of the measuring results of the measurements during the fine sampling procedure, compares the combined sampling amplitudes with the mathematical expression for the pulse shape and looks for a time shift which gives the best fit, wherein this time shift together with the starting time of the sampling interval gives the time difference between the internal measuring pulse and the measuring pulse.

12. A method for measuring distances through the atmosphere towards a target, where a light signal is transmitted towards the target and a reflected light signal is received back from the target, comprising:
performing a coarse measuring procedure including:
determining a measuring time interval longer than an estimated propagation time of the light signal to and from the target; and
fixing at least one time point in the measuring time interval in which the reflected light signal is expected to be received;
performing a fine measuring procedure including:
transmitting a number of light pulses towards the target; and
collecting signal information for each reflected light pulse in a measuring time region determined within the measuring time interval according to the time point;
combining measuring results of the coarse measuring procedure and the fine measuring procedure with each other to determine a distance to the target.

13. A method according to claim 12 wherein the coarse measuring method further comprises:
transmitting a light pulse towards the target;
detecting the light pulse reflected by the target;
determining an approximate position of the reflected light pulse within the measuring time interval; and
calculating a position of the measuring time region within the measuring time interval based upon the approximate position of the reflected light pulse.

14. A method according to claim 12 wherein the fine measuring procedure uses more light pulses than the coarse measuring procedure and the light pulses transmitted during the coarse measuring procedure have a higher intensity than the light pulses transmitted during the fine measuring procedure.

15. A method according to claim 13 wherein a number of light pulses are transmitted during the coarse measuring procedure and the approximate position of each reflected light pulse is combined to determine the position of the measuring time region.

16. A method according to claim 12 wherein the fine measuring procedure further comprises shifting the measuring time region until the light pulse reflected from the target is in the measuring time region, and the distance to the target is calculated based on the shift of the measuring time region and the reflected pulse's position in the measuring time region.

17. A method according to claim 16 further comprising:
forming a time dependent signal in the measuring time region;
multiplying the time dependent signal by the light pulse in the measuring time region to form a first product; and
integrating the first product over the measuring time period.

18. A method according to claim 17 wherein the time dependent signal has a zero transition through a zero line in the measuring time region and is symmetric on both sides of the zero line.

19. A method according to claim 18 wherein the time dependent signal is rising or falling from one end point of the measuring time to the other.

20. A method according to claim 17 further comprising:
multiplying the reflected light pulse in the measuring time region by a time independent signal to form a second product;
integrating the second product over the measuring time region;
dividing the integrated first product with the integrated second product; and
determining an optimal placement of the time point within the measuring time interval when the result of the division is close to zero.

21. A method according to claim 12 wherein the transmitted light pulse is also transmitted over an internal measuring path, the fine measuring procedure is carried out for a measuring time region in which the internal light pulse is received and the distance to the target is determined based on a time between the measuring regions and the position of the light pulses in their respective measuring regions.

22. A method according to claim 16 wherein the light pulse is also transmitted over an internal measuring path and further comprising:

performing the fine measuring procedure in a measuring time region in which the internal measuring pulse is received;

sampling the received internal measuring pulse during the shifting such that a tight sampling position is obtained; and obtaining parameters in a mathematical expression describing the internal pulse based on amplitudes of the sampling points.

23. A method according to claim 22 wherein at least two samples per light pulse, with a starting point from the time point fixed during the coarse measuring;

combining the amplitudes of the samples;

comparing the mathematical expression with the combined samples; and determining a time shift based on the comparison, wherein the time shift and the start time of the sampling provides a time difference between the reference pulse and the reflected pulse.

* * * * *